United States Patent [19]

Minami

[11] Patent Number: 5,464,147

[45] Date of Patent: Nov. 7, 1995

[54] METHOD OF CONNECTING CYLINDRICAL MEMBERS TO EACH OTHER USING TANDEM TYPE INTERNAL CLAMP

[75] Inventor: Nobuyoshi Minami, Yokohama, Japan

[73] Assignee: Chiyoda Corporation, Yokohama, Japan

[21] Appl. No.: 309,357

[22] Filed: Sep. 21, 1994

[30] Foreign Application Priority Data

Sep. 21, 1993 [JP] Japan .................................. 5-256327

[51] Int. Cl.$^6$ ................................................ B23K 37/053
[52] U.S. Cl. ........................................ 228/212; 228/44.5
[58] Field of Search .................................. 228/212, 219, 228/42, 44.5, 49.3; 219/61.1

[56] References Cited

U.S. PATENT DOCUMENTS

| | | | |
|---|---|---|---|
| 3,633,813 | 12/1972 | Looney et al. | 228/44.5 |
| 4,053,973 | 10/1977 | Meli | 228/44.5 |
| 4,648,544 | 3/1987 | Puisais et al. | 219/61.1 |
| 5,356,067 | 10/1994 | Leduc | 228/49.3 |

Primary Examiner—Samuel M. Heinrich
Attorney, Agent, or Firm—Armstrong, Westerman, Hattori, McLeland and Naughton

[57] ABSTRACT

To connect cylindrical members, e.g., pipes to each other by welding, a tandem type internal clamp composed of two or more clamps is used as an essential component. Prior to each welding operation, the tandem type internal clamp is located in position in a pipe to be newly connected to a pipe already connected to a preceding pipe. At this time, one of the clamps corresponding to a circular welding seam is slightly projected outside of one end of the new pipe. As expansion ring segments are radially displaced in the outward direction, seal ring segments are brought in close contact with the inner peripheral surface of the new pipe. Subsequently, the new pipe is displaced toward the already connected pipe until the tapered welding edges of both the pipes abut against each other, causing the projected part of the clamp to be inserted into the already connected pipe. After positional offset of the new pipe relative to the already connected pipe is eliminated if any, inert gas is fed into the hollow space defined between the seal ring segments of each of the clamps so as to start a welding operation to be performed around the tapered welding edges of both the pipes.

2 Claims, 10 Drawing Sheets

5,464,147

METHOD OF CONNECTING CYLINDRICAL MEMBERS TO EACH OTHER USING TANDEM TYPE INTERNAL CLAMP

BACKGROUND OF THE INVENTION

1. Field of the Invention

The present invention relates generally to a method of connecting cylindrical members to each other. More particularly, the present invention relates to a method of connecting cylindrical members such as pipes, cylindrical casing segments or the like to each other using a tandem type internal clamp.

2. Description of the Related Art

Before cylindrical members, e.g., pipes each having a comparative large diameter are connected to each other by employing a welding process, many manhours are required for achieving preliminary works which are exemplified by a pipe laying operation, a centering operation, a welding groove aligning operation, and an adjusting operation.

Especially, when a centering operation and a welding groove aligning operation are performed in a working site, it is necessary to conduct two preliminary works in order to hold pipes in the correct positional relationship in such a manner as to allow the end face of one pipe to be correctly aligned with the end face of other pipe to be connected to the one pipe. One of the preliminary works is such that a metallic member that is called a temporary lug is provisionally welded to the peripheral surface of one pipe at the position in the vicinity of the end face of the latter, and the other preliminary work is such that a wedge-shaped member that is called a bat is squeezed below the temporary lug by actuating a hammer or the like tool.

In addition, when a pipe connecting operation is practically performed at a high working site, e.g., a pipe rack or it is performed in a narrow space such as a pipe trench, a culvert or the like, it is completed only with much difficulties. In the circumstances, many requests have been hitherto raised from welding operators for providing a method of connecting cylindrical members such as pipes, cylindrical casing segments or the like to each other with a higher level of safety.

SUMMARY OF THE INVENTION

The present invention has been made in consideration of the aforementioned background.

An object of the present invention is to provide a method of simply and safely connecting cylindrical members such as pipes, cylindrical casing segments or the like to each other using a tandem type internal clamp regardless of a length of each cylindrical member without any necessity for provisionally welding a various kind of auxiliary tool, e.g., a temporary lug to one of the pipes.

According to one aspect of the present invention, there is provided a method of connecting cylindrical members such as pipes or the like to each other using a tandem type internal clamp composed of two or more clamps each including a main ring of which peripheral part exhibits a channel-shaped sectional contour and a plurality of expansion ring segments fitted into the main ring so as to be displaced in the radial direction, each of the expansion ring segments having two seal ring segments fixedly secured thereto on the opposite sides thereof, wherein the method comprises a step of locating the tandem type internal clamp in position in a first cylindrical member to be newly connected to a second cylindrical member already connected to a preceding cylindrical member in such a manner as to allow one of the clamps corresponding to a circular welding seam to be slightly projected outside of the first cylindrical member, a step of radially displacing expansion ring segments of other clamp in the outward direction, causing seal ring segments of the other clamp to come in tight contact with the inner peripheral surface of the first cylindrical member, a step of displacing the first cylindrical member until a tapered welding edge of the latter abuts against a tapered welding edge of the second cylindrical member, a step of inserting the projected part of the one clamp into the second cylindrical member, a step of radially displacing expansion ring segments of the one clamp in the outward direction, causing one of the seal ring segments of the one clamp to come in tight contact with the inner peripheral surface of the second cylindrical member, a step of eliminating positional offset of the first cylindrical member relative to the second cylindrical member if any, by bringing the seal ring segments of the first and second cylindrical members in tight contact with the inner peripheral surfaces of the latter, a step of feeding inert gas into the hollow space defined between the seal ring segments of each of the clamps, and a step of performing a welding operation around the tapered welding edges of the first and second cylindrical members abutting against each other.

In addition, according to other aspect of the present invention, there is provided a method of connecting short cylindrical member such as cylindrical casing segments or the like to each other using a tandem type internal clamp composed of two or more clamps each including a main ring of which peripheral part exhibits a channel-shaped sectional contour and a plurality of expansion ring segments fitted into the main ring so as to be displaced in the radial direction, each of the expansion ring segments having two seal ring segments fixedly secured thereto on the opposite sides thereof, wherein the method comprises a step of locating the tandem type internal clamp in position in a first short cylindrical member to be newly connected to a second short cylindrical member already connected to a preceding short cylindrical member in such a manner as to allow one of the clamps corresponding to a circular welding seam to be slightly projected outside of the first short cylindrical member, a step of radially displacing expansion ring segments of other clamp in the outward direction, causing seal ring segments of the other clamp to come in tight contact with the inner peripheral surface of the first short cylindrical member, a step of displacing the first short cylindrical member until a tapered welding edge of the latter abuts against a tapered welding edge of the second short cylindrical member, a step of inserting the projected part of the one clamp into the second short cylindrical member, a step of radially displacing expansion ring segments of the one clamp in the outward direction, causing one of seal ring segments of the one clamp to come in tight contact with the inner peripheral surface of the second short cylindrical member, a step of eliminating positional offset of the first short cylindrical member relative to the second short cylindrical member if any, by bring the seal ring segments of the first and second short cylindrical members in tight contact with the inner peripheral surfaces of the latter, a step of feeding inert gas into the hollow space defined between the seal ring segments of each of clamps, and a step of performing a welding operation around the tapered welding edges of the first and second short cylindrical members abutting against each other.

When the method of the present invention is practiced in the above-described manner, a part of the clamp located on the welding seam side is slightly projected outside of one end of the first cylindrical member while other clamp located on the stationary side is immovably held in the first cylindrical member. At this time, the foregoing part of the clamp on the welding seam side is inserted into the second cylindrical member at one end of the latter, and subsequently, one of the seal ring segments on the clamp on the welding seam side is radially displaced in the outward direction until it comes in tight contact with the inner peripheral surface of the second cylindrical member, whereby any positional offset of the first cylindrical member relative to the second cylindrical member is forcibly eliminated. After the first and second cylindrical members are firmly held by their seal ring segments while maintaining correct positional alignment with each other as seen in the axial direction, a welding operation is performed around their tapered welding edges.

In the case that short cylindrical members are connected to each other in the above-described manner, it is recommendable that the first short cylindrical member is raised up by operating a crane so that it is placed on the second short cylindrical member as it is gradually lowered. At this time, a part of the clamp on the welding seam side is likewise inserted in the second short cylindrical member at the upper end of the latter, and subsequently, one of seal rings on the clamp on the welding seam side is brought in tight contact with the inner peripheral surface of the second short cylindrical member, whereby the first and second short cylindrical members are immovably held with the aid of the tandem type internal clamp so as to perform a welding operation around their tapered welding edges.

Other objects, features and advantages of the present invention will become apparent from reading of the following description which has been made in conjunction with the accompanying drawings.

DESCRIPTION OF THE PREFERRED EMBODIMENTS

Figure 1:
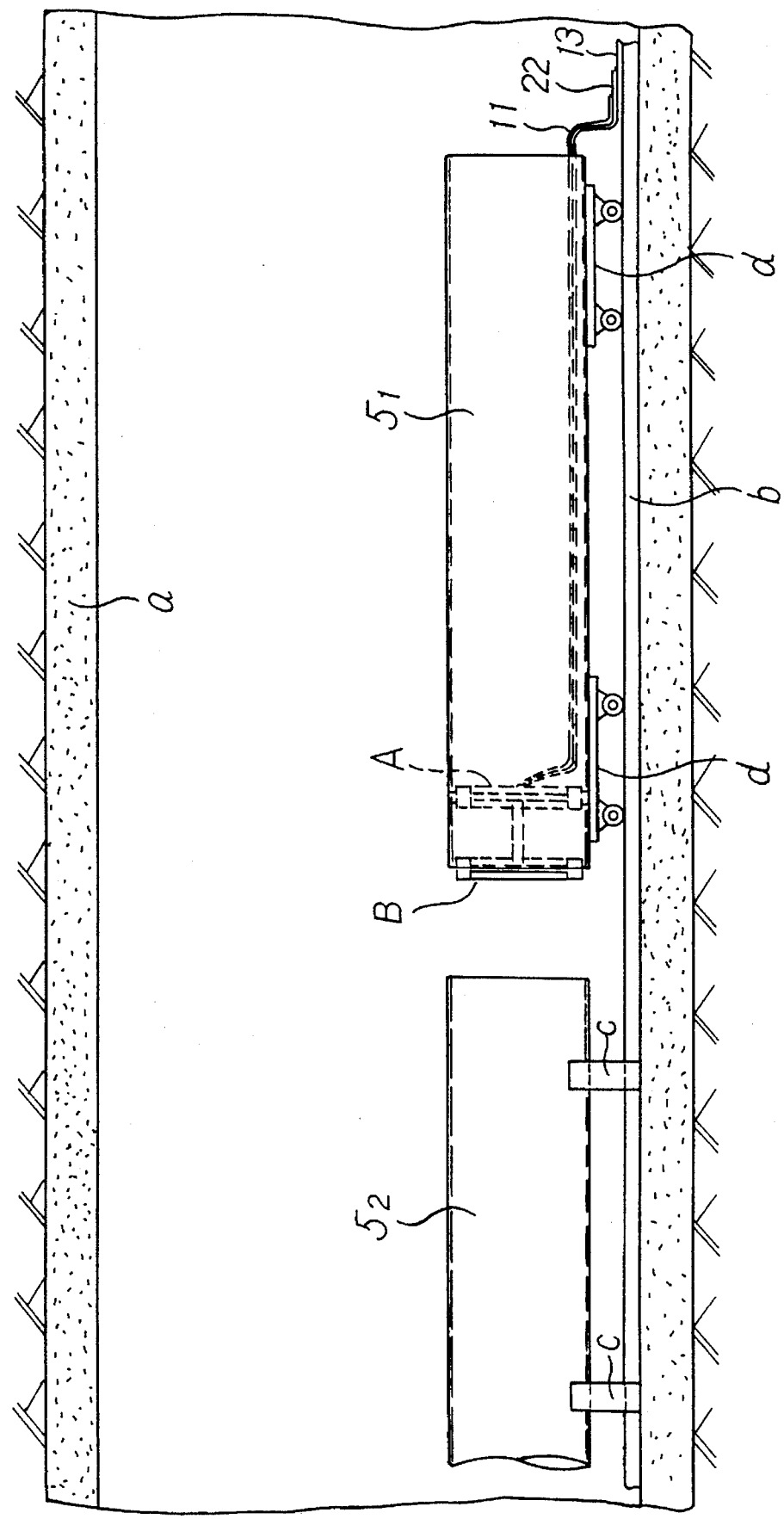
FIG. 1 is a sectional view which schematically illustrates a method of connecting pipes to each other using a tandem type internal clamp in accordance with a first embodiment of the present invention.

The present invention will now be described in detail hereinafter with reference to the accompanying drawings which illustrate preferred embodiments thereof.

First, a method of connecting pipes to each other in accordance with a first embodiment of the present invention will be described below with reference to FIG. 1 to FIG. 5.

Prior to description of a method to be practiced in accordance with the first embodiment of the present invention, a tandem type internal clamp employable for practicing the method will be described below with reference to FIG. 2 to FIG. 4. The tandem type internal clamp is substantially composed of two clamps A and B jointed to each other, and each of the clamps A and B is constructed in the following manner. Specifically, each clamp includes a main ring 1 of which peripheral part exhibits a channel-shaped sectional contour (see FIG. 2), and two support rods 2 are crosswise arranged to support the inner peripheral surface of the main ring 1. In addition, three expansion ring segments $3_1$, $3_2$ and $3_3$ each having a channel-shaped sectional contour are fitted into the channel-shaped hollow space of the main ring 1 along the outer periphery of the latter in the equally spaced relationship while facing to each other in the circumferential direction (see FIG. 3). To prevent the expansion ring segments $3_1$, $3_2$ and $3_3$ from being disengaged from the main ring 1 in the radial direction, two coil springs $4_1$ and $4_2$ are fitted around the expansion ring segments $3_1$, $3_2$ and $3_3$ (see FIG. 4).

Seal ring segments $6_1$ and $6_2$ adapted to come in contact with the inner surface of each of a pipe $5_1$ to be newly connected and a pipe $5_2$ already connected to a preceding pipe (not shown) are fixedly secured to the central part of each of the expansion ring segments $3_1$, $3_2$ and $3_3$ on the opposite sides of the latter while standing upright from the same at the abutting position between both the pipes $5_1$ and $5_2$. An outer joint member 7 having a channel-shaped sectional contour is received between both the seal ring segments $6_1$ and $6_2$ in such a manner that it is kept open to the outside, it is fixedly secured to one end part of each of the expansion ring segments $3_1$, $3_2$ and $3_3$, and its free end part is projected over adjacent expansion ring segment as if it is bridged between adjacent expansion ring segments (see FIG. 5). In addition, an inner joint member 8 having a channel-shaped sectional contour is received in the hollow space defined between both side ribs of each of the expansion ring segments $3_1$, $3_2$ and $3_3$ in such a manner that it is kept open to the inside, it is fixedly secured to the inner surface of each of the expansion ring segments $3_1$, $3_2$ and $3_3$, and it is bridged between adjacent expansion ring segments while facing to the outer joint member 7 (see FIG. 5).

With this construction, the expansion rings $3_1$, $3_2$ and $3_3$ are fitted into the channel-shaped annular hollow space along the peripheral part of the main ring 1 while they are interposed between the outer joint member 7 and the inner joint member 8. When the expansion ring segments $3_1$, $3_2$ and $3_3$ are radially contracted to assume a minimum diameter, their end faces abut against each other. On the contrary, when they are radially expanded to assume a maximum diameter, their end faces are located between the outer joint member 7 and the inner joint member 8 without any appearance of a gap therebetween.

On the other hand, ring-shaped rubber tubes $9_1$ and $9_2$ are disposed on the opposite sides of the substantially U-shaped annular hollow space of the main ring 1, and they are communicated with pressurized fluid feed pipes $10_1$ and $10_2$ both of which are fixedly secured to the main body 1 by threadably tightening nuts. In addition, an inert gas feed pipe 11 radially extending through the main ring 1 is arranged on the main ring 1 in such a manner that a feed port 12 is opened at the central part of a channel-shaped annular hollow space as defined between both the seal ring segments $6_1$ and $6_2$ on each of the expansion ring segments $3_1$, $3_2$ and $3_3$.

Figure 2:
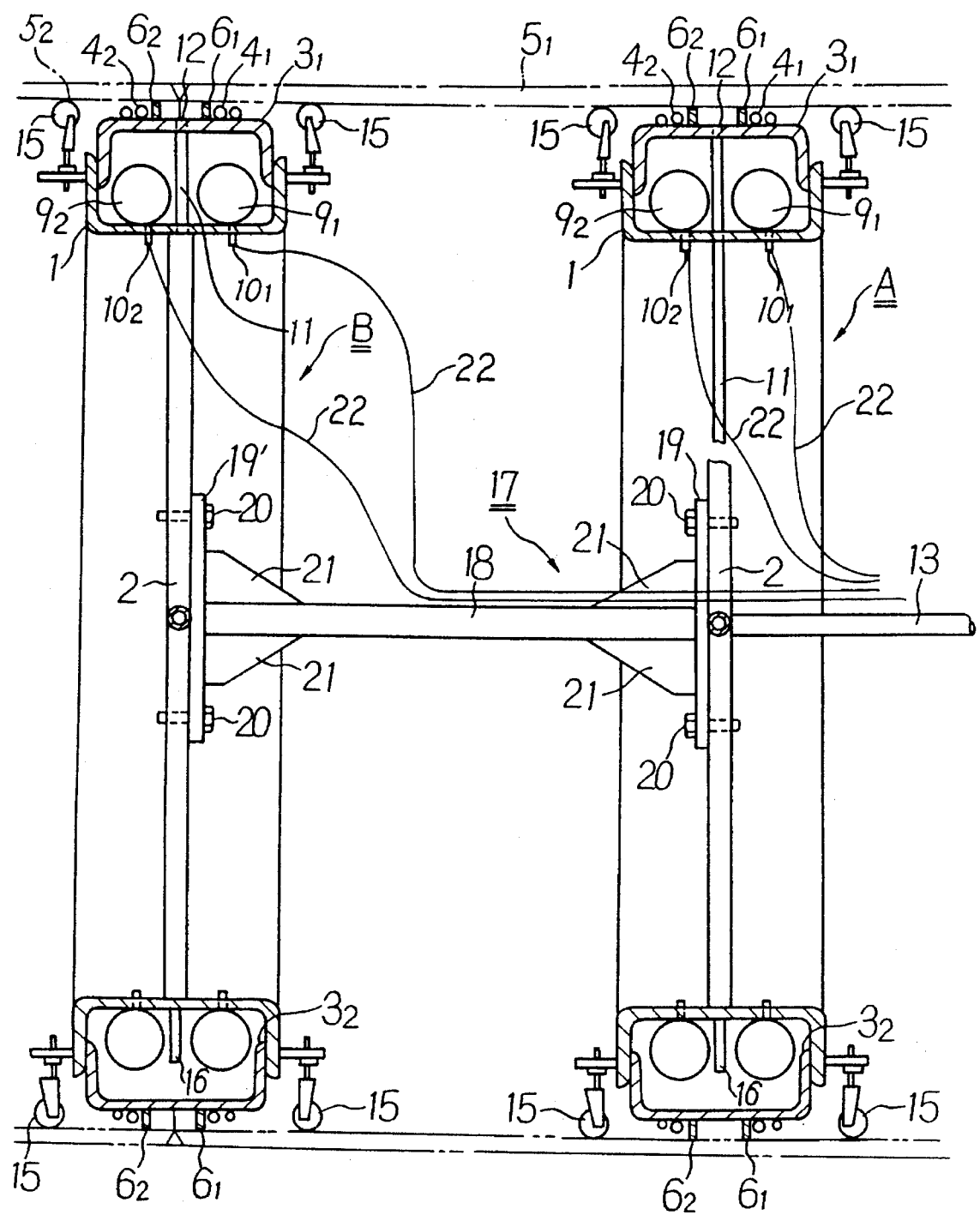
FIG. 2 is a sectional view of a twin type internal clamp to be used for practicing the method illustrated in FIG. 1.
Figure 3:
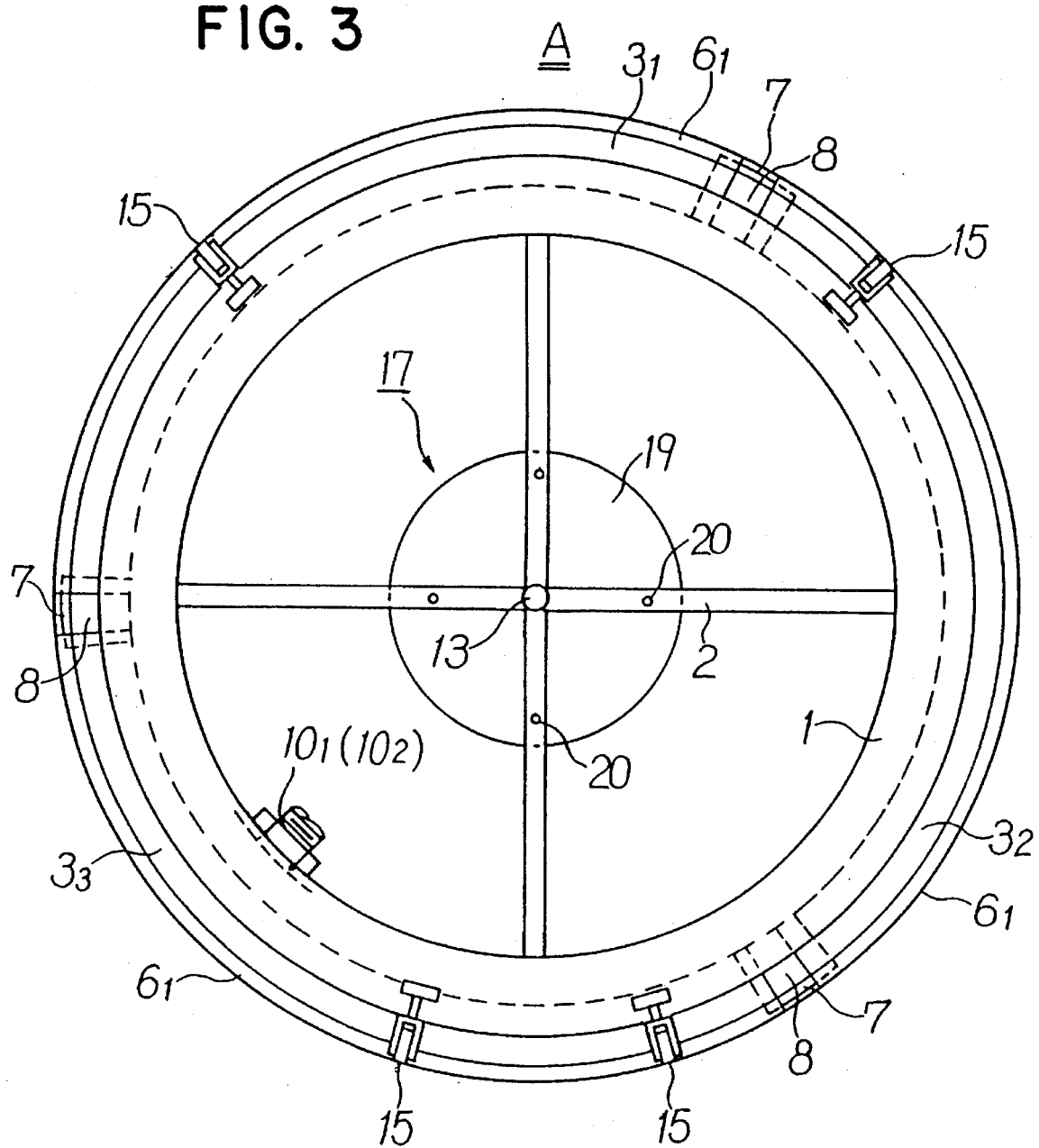
FIG. 3 is a front view of the twin type internal clamp shown in FIG. 2.
Figure 4:
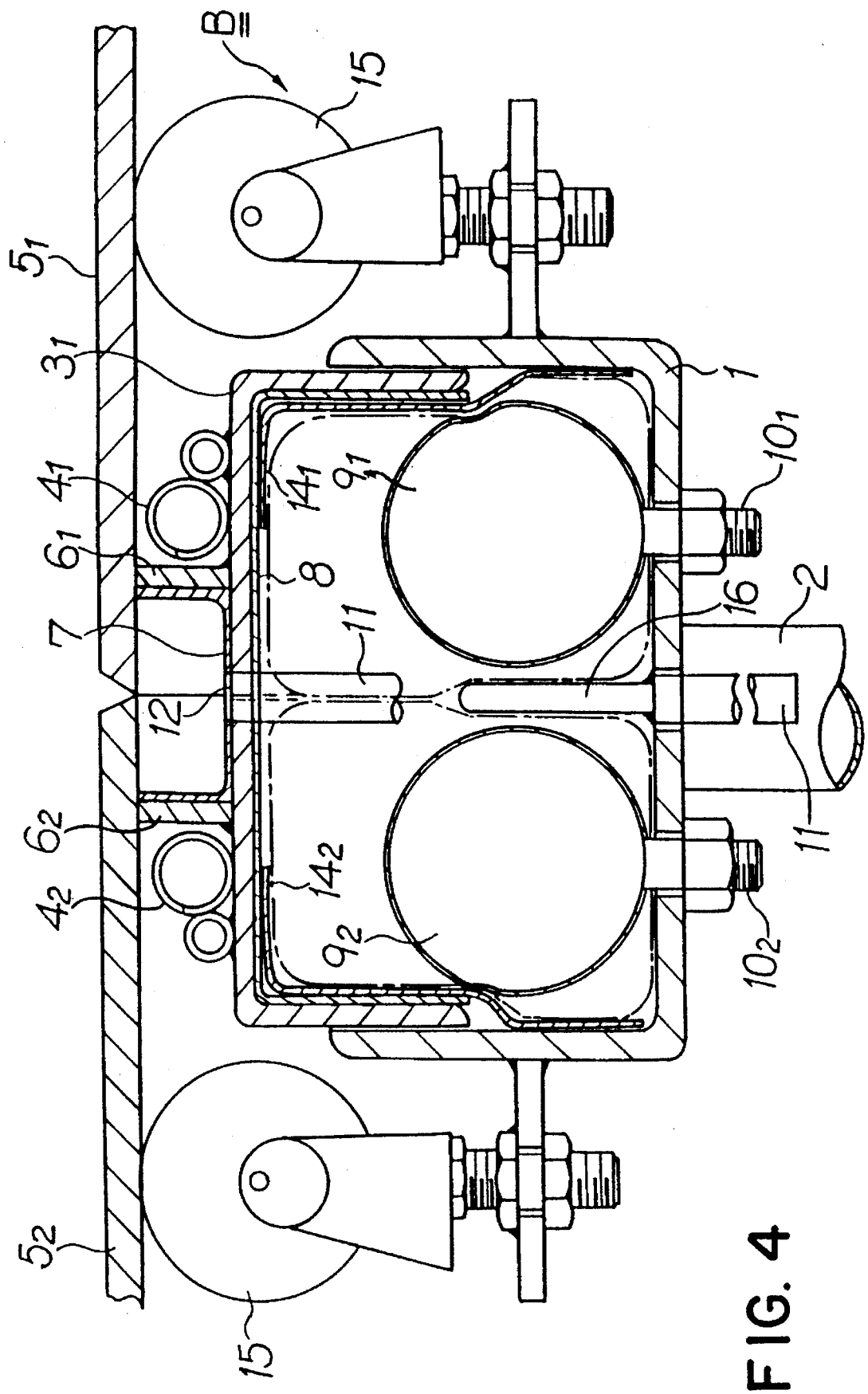
FIG. 4 is an enlarged sectional view which shows the arrangement of essential components constituting the tandem type internal clamp.
Figure 5:
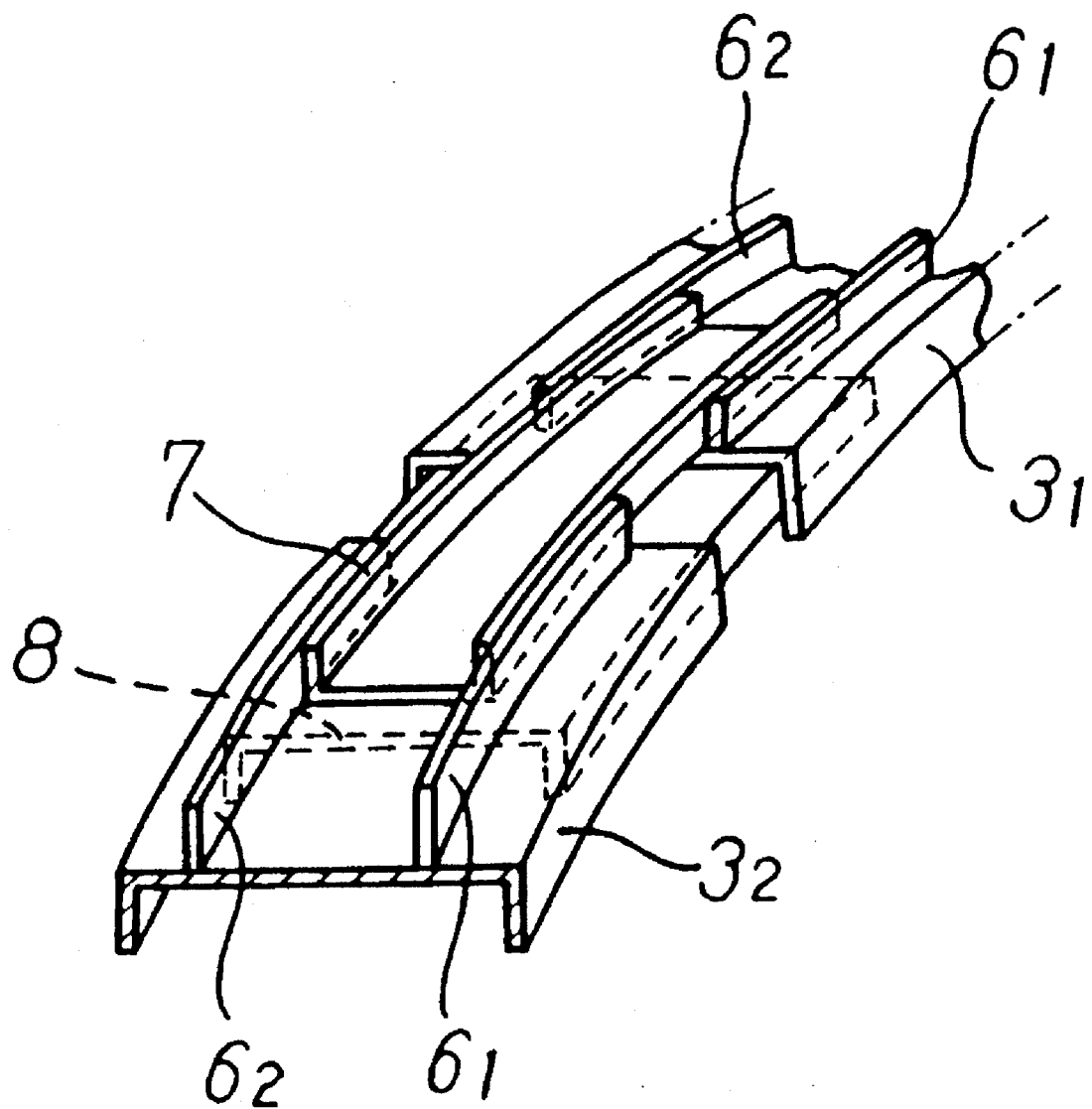
FIG. 5 is a perspective view which shows a plurality of expansion ring segments arranged in the region where they abut against each other with the aid of associated components.

In FIG. 2 and FIG. 3, reference numeral 13 designates an actuation rod or rope for allowing the tandem type internal clamp to be axially displaced through both the pipes $5_1$ and $5_2$. In FIG. 4, reference numerals $14_1$ and $14_2$ designate protectors which serve to protectively prevent the rubber tubes $9_1$ and $9_2$ from being received between the main ring 1 and each of the expansion ring segments $3_1$, $3_2$ and $3_3$ in the clamped state.

As is best seen in FIG. 2, four casters 15 are arranged on the opposite sides of the main ring 1 at the upper and lower parts of the latter for each of the clamps A and B in order to assure that both the clamps A and B can slidably be displaced in the axial direction through the pipes $5_1$ and $5_2$ with the aid of casters 15. In the shown case, eight casters 15 in total are arranged for both the clamps A and B. In FIG. 4, reference numeral 16 designates a partitioning plate.

Both the clamps A and B each constructed in the above-described manner are jointed to each other with the aid of a jointing device 17 bridged therebetween. Specifically, the jointing device 17 is constructed such that fitting plates 19 and 19' are fixedly secured to the opposite ends of a joint rod 18 and they are then detachably fitted to the crosswise arranged support rods 2 by threadably tightening bolts 20. In the shown case, two clamps A and B are arranged for the pipes $5_1$ and $5_2$ but the number of clamps should not be limited only to two. It is acceptable that two or more clamps are arranged for the pipes $5_1$ and $5_2$.

Next, a pipe connecting operation to be performed in a trench a using the tandem type internal clamp as constructed in the aforementioned manner will be described below with reference to FIG. 1. Prior to the pipe connecting operation, rails b for allowing the tandem type internal clamp to be axially displaced through the trench a are laid on the bottom of the trench a. While the pipe $5_2$ which was already connected to a preceding pipe (not shown) is supported on a support platforms c, the pipe $5_1$ to be newly connected to the pipe $5_2$ is connected to the latter. To this end, the tandem type internal clamp is inserted into the pipe $5_1$ from the right-hand side of the trench a, and subsequently, the pipe $5_1$ is displaced in the forward direction until the central part of the seal ring segments $6_1$ and $6_2$ for the clamp B (located on the welding seam side) is correctly aligned with the foremost end of a tapered welding edge of the pipe $5_1$. Thereafter, when pressurized fluid such as compressed air or the like is fed to the rubber tubes $9_1$ and $9_2$ of the clamp A (located on the stationary side) via hoses 22 and the feed pipes $10_1$ and $10_2$, the rubber tubes $9_1$ and $9_2$ are expanded so as to allow the expansion ring segments $3_1$, $3_2$ and $3_3$ to be radially thrusted in the outward direction. This causes the expansion ring segments $3_1$, $3_2$ and $3_3$ to be slidably displaced in the channel-shaped hollow space along the outer periphery of the main ring 1 in the outward direction. At this time, free ends of the expansion ring segments $3_1$, $3_2$ and $3_3$ are parted away from each other while they are sealably located between the outer joint member 7 and the inner joint member 8, whereby the seal ring segments $6_1$ and $6_2$ come in contact with the inner peripheral surface of the pipe $5_1$, resulting in the clamp A being immovably held in the pipe $5_1$. When the seal rings $6_1$ and $6_2$ on each of the expansion ring segments $3_1$, $3_2$ and $3_3$ are brought in tight contact with the inner peripheral surface of the pipe $5_1$, the feeding of compressed air is interrupted, and thereafter, the foregoing immovable state is maintained further.

The pipe $5_1$ having the tandem type internal clamp immovably held therein is laid on movable platform wagons d mounted on the rail b as shown in FIG. 1. As the movable platform wagons d moved along the rails b in the leftward direction as seen in FIG. 1, the pipe $5_1$ is displaced in the same direction. When the tapered welding edge of the pipe $5_1$ abuts against a tapered welding edge of the pipe $5_2$ (see FIG. 4), the seal ring segment $6_2$ of the clamp B is received in the right-hand end part of the pipe $6_2$.

Subsequently, when pressurized fluid is fed to both the rubber tubes $9_1$ and $9_2$ of the clamp B, causing the rubber tubes $9_1$ and $9_2$ to be radially expanded, the expansion ring segments $3_1$, $3_2$ and $3_3$ are radially thrusted in the outward direction so that they are slidably displaced in the channel-shaped hollow space along the outer periphery of the main ring 1.

As the respective expansion ring segments $3_1$, $3_2$ and $3_3$ of the clamps A and B are displaced in the outward direction in the above-described manner, the seal ring segments $6_1$ and $6_2$ of the clamps A and B come in tight contact with the inner peripheral surfaces of the pipes $5_1$ and $5_2$. At this time, provided that some positional offset is present between both the pipes $5_1$ and $5_2$ as viewed in the axial direction, the seal ring segment $6_2$ is brought in tight contact with the inner peripheral surface of the pipe $5_1$ having the foregoing positional offset relative to the pipe $5_2$ in ahead of the seal ring segment $6_1$, and thereafter, as the seal ring segment $6_2$ is radially displaced in the outward direction, the positional offset of the pipe $5_1$ is eliminated. While the pipe $5_1$ is correctly aligned with the pipe $5_2$ as viewed in the axial direction without any positional offset, the seal ring segments $6_1$ and $6_2$ of the clamps A and B are simultaneously brought in tight contact with the inner peripheral surfaces of both the pipes $5_1$ and $5_2$. After correct positional alignment is made between both the pipes $5_1$ and $5_2$, the pressure of pressurized fluid is increased to reach a predetermined level, resulting in the clamp B being immovably held at the tapered welding edges of both the pipes $5_1$ and $5_2$.

Subsequently, as inert gas is introduced into the substantially U-shaped hollow space defined between both the seal ring segments $6_1$ and $6_2$ from the feed port 12 via the inert gas feed pipe 11, the foregoing hollow space is increasingly filled with the inert gas. Since the location where the seal rings $6_1$ and $6_2$ are not present is sealably covered with the outer joint member 7 and the inner joint member 8, gas leakage from the foregoing hollow space can be minimized.

While the foregoing state is maintained, a welding operation is performed around the tapered welding edges of both the pipes $5_1$ and $5_2$ which has abutted against with each other.

On completion of the welding operation, the feeding of inert gas is interrupted, and moreover, the feeding of pressurized fluid to the rubber tubes $9_1$ and $9_2$ in both the clamps A and B is interrupted, whereby the expansion ring segments $3_1$, $3_2$ and $3_3$ are radially contracted by the resilient force of the coil springs $4_1$ and $4_2$ while discharging fluid from the rubber tubes $9_1$ and $9_2$ until the opposite end faces of the expansion ring segments $3_1$, $3_2$ and $3_3$ come in contact with each other.

Thereafter, the clamp B is displaceably recovered in the pipe $5_1$ together with the hose 22 and other components by pulling the rope 13. Thus, a plurality of pipes are successively connected to each other by repeating the aforementioned steps of operations.

Figure 6:
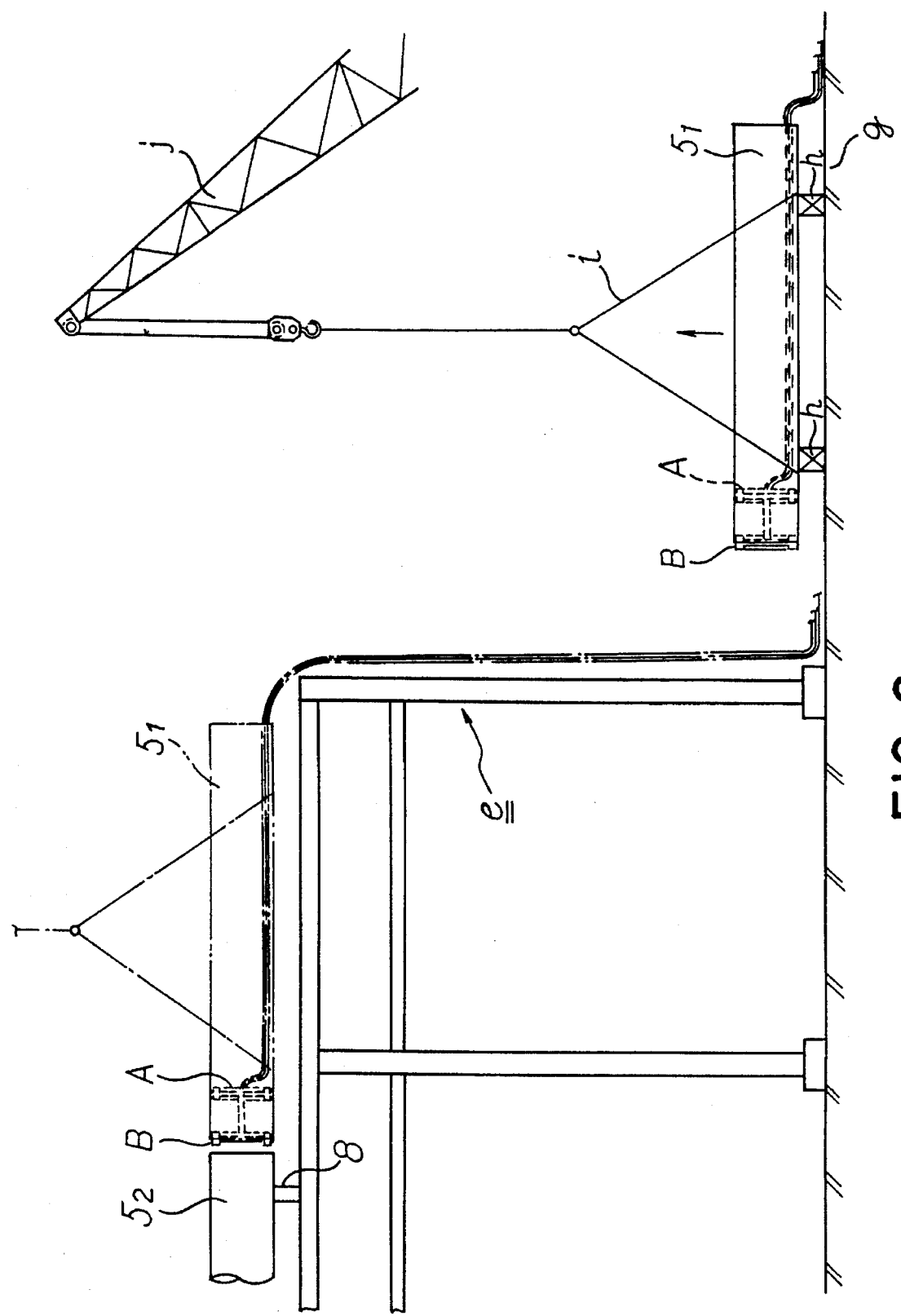
FIG. 6 is a side view which illustrates a method of connecting pipes to each other using a tandem type internal clamp in accordance with a second embodiment of the present invention.

Next, a method of connecting cylindrical members, e.g., pipes to each other using a tandem type internal clamp in accordance with a second embodiment of the present invention will be described below with reference to FIG. 6. This embodiment is concerned with a pipe connecting operation to be performed on a pipe rack e. As shown in the drawing, a pipe $5_2$ already connected to a preceding pipe (not shown) is laid on the pipe rack e via stationary support platforms f. A pipe $5_1$ to be newly connected to the pipe $5_2$ is connected to the latter by employing the method in accordance with the second embodiment of the present invention.

Specifically, the pipe $5_1$ is laid on a floor surface g via stationary support platforms h, and subsequently, the tandem type internal clamp is inserted into the pipe $5_1$ in the axial direction while a rope 13, hoses 22 and inert gas feed pipes 11 are drawn outside of the pipe $5_1$ via an opening portion on the right-hand side of the pipe $5_1$ in the same manner as the first embodiment of the present invention. Thereafter, a wire rope i is wound about the pipe $5_1$ which in turn is suspended from a crane j, and subsequently, the pipe $5_1$ is displaced on the pipe rack e by operating the crane j so that a tapered welding edge of the pipe $5_1$ abuts against a tapered welding edge of the pipe $5_2$. At this time, one of seal ring segments of a clamp B, i.e., a seal ring segment $6_2$ of the same is inserted into the right-hand end part of the pipe $5_2$.

Subsequently, pressurized fluid is fed into rubber tubes $9_1$ and $9_2$ so as to radially expand the rubber tubes $9_1$ and $9_2$ in the outward direction, causing expansion ring segments $3_1$, $3_2$ and $3_3$ to be radially displaced to the outward direction, and thereafter, positional offset of the pipe $5_1$ relative to the pipe $5_2$ is eliminated if any, by bringing both seal ring segments $6_1$ and $6_2$ in tight contact with the inner peripheral surfaces of the pipes $5_1$ and $5_2$ so that the pipe $5_1$ is correctly aligned with the pipe $5_2$ in the same manner as the first embodiment as mentioned above. Subsequently, inert gas is fed into the hollow space defined between the seal ring segments $6_1$ and $6_2$ so as to enable a welding operation to be performed around tapered welding edges of the pipes $5_1$ and $5_2$.

On completion of the welding operation, the pipe $5_1$ is immovably held on stationary support platforms (not shown), the wire rope i is disconnected from the pipe $5_1$, and subsequently, the tandem type internal clamp is taken out of the pipe $5_1$.

Figure 7:
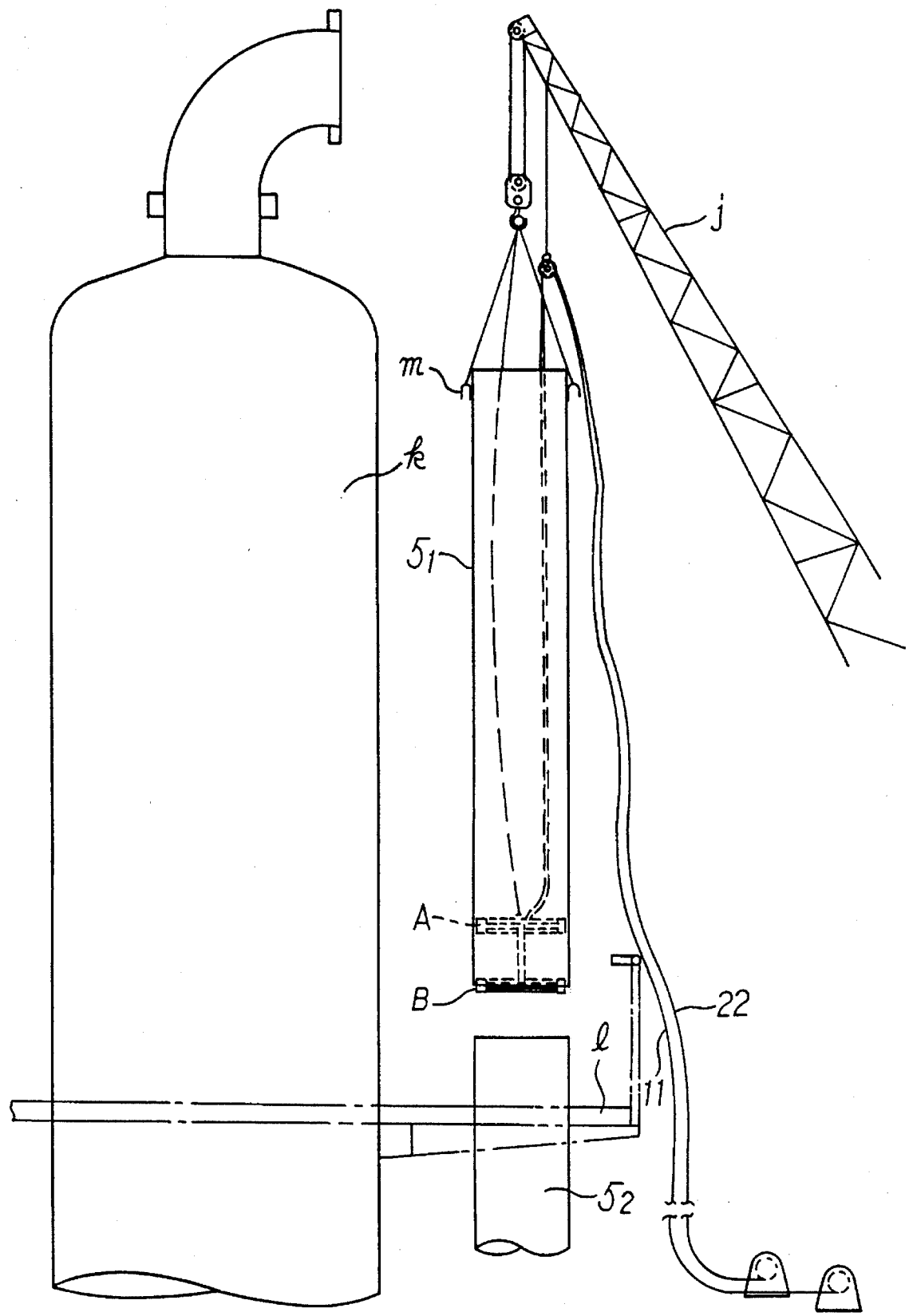
FIG. 7 is a side view which illustrates a method of connecting pipes to each other with a vertical attitude using a tandem type internal clamp in accordance with a third embodiment of the present invention.

Next, a method of connecting cylindrical members, e.g., pipes to each other with a vertical attitude using a tandem type internal clamp in accordance with a third embodiment of the present invention will be described below with reference to FIG. 7.

This embodiment is concerned with a vertical pipe line installing work which is intended to build a vertically extending pipe line to be suspended from the top of, e.g., a distillation tower k. Concretely, FIG. 7 shows the operative state that a pipe $5_1$ to be newly connected to a pipe $5_2$ already connected to a preceding pipe (not shown) is connected to the pipe $5_2$ which is firmly held by an intermediate platform of the distillation tower k with a vertical attitude.

A tandem type internal clamp is inserted into the pipe $5_1$ in such a manner as to firmly hold a clamp A at one end of the pipe $5_1$ remote from the pipe inserting side while it is laid on the floor surface in the same manner as the second embodiment. Hooks m are fixed to the outer peripheral surface of the pipe $5_1$ at the opposite end of the latter, the pipe $5_1$ is then suspended with a vertical attitude by operating a crane j, and subsequently, the pipe $5_1$ is gradually lowered until it is placed on the upper end of the pipe $5_2$.

Thereafter, both the pipes $5_1$ and $5_2$ are connected to each other by performing a welding operation around their tapered welding edges abutting against each other in the same manner as each of the first and second embodiments as mentioned above.

Figure 8:
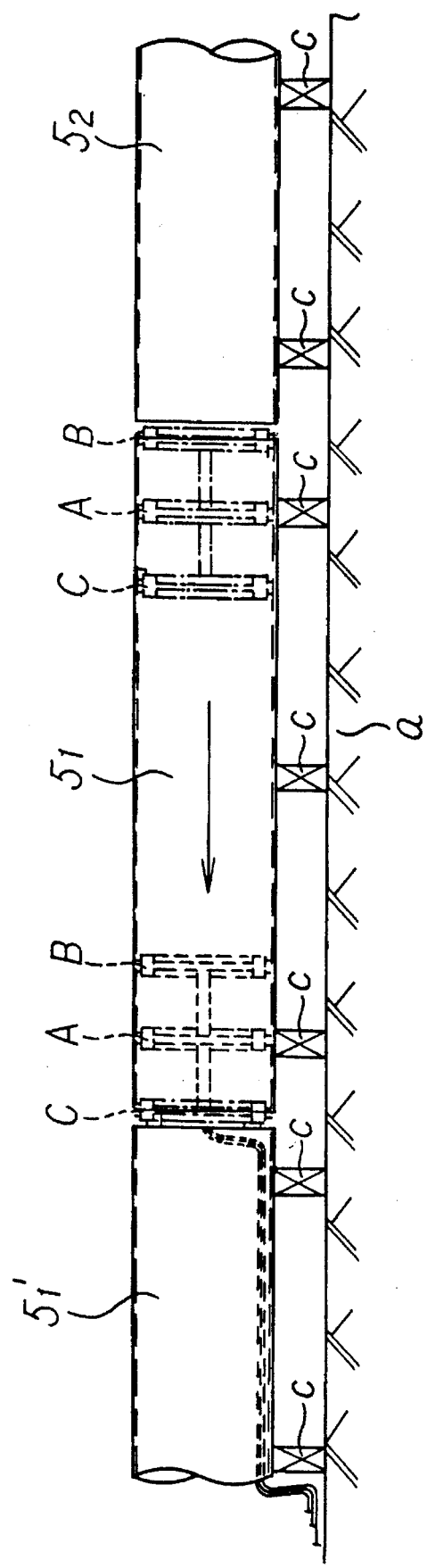
FIG. 8 is a side view which illustrates a method of connecting pipes to each other using a tandem type internal clamp in accordance with a fourth embodiment of the present invention.

Next, a method of connecting cylindrical members, e.g., pipes to each other using a tandem type internal clamp in accordance with a fourth embodiment of the present invention will be described below with reference to FIG. 8.

In this embodiment, the tandem type internal clamp is composed of three clamps A, B and C jointed to each other, and each of the clamps A, B and C is designed to have a same structure.

When a pipe $5_1$ to be newly connected to a pipe $5_2$ already connected to a preceding pipe (not shown) is connected to the pipe $5_2$, a seal ring $6_2$ of the clamp B is located such that a part of the seal ring segment $6_2$ is projected outside of the pipe $5_1$. At this time, the clamp A and the clamp C are firmly held in the pipe $5_1$ with the aid of pressurized fluid fed from a supply source (not shown). Thereafter, both the pipes $5_1$ and $5_2$ are connected to each other by performing a welding operation around their tapered welding edges abutting against each other in the same manner as each of the first and second embodiments as mentioned above.

After the pipe $5_1$ is connected to the pipe $5_2$, it is held on the floor surface via stationary support platforms c, and moving platform wagons d as shown in FIG. 1 (but not shown in FIG. 8) are dispaceably recovered to the original positions. Subsequently, a pipe $5'_1$ to be newly connected to the pipe $5_1$ is laid on the movable platform wagons and then displaced in the rightward direction until it abuts against the pipe $5_1$ of which connecting operation has been completed. Thereafter, the clamps A, B and C are released from the fixed state, and the tandem type internal clamp is slidably displaced toward the pipe $5'_1$ in the arrow-marked direction. At this time, a seal ring segment $6_1$ of the seal ring C is inserted into the pipe $5'_1$ at the right-hand end of the latter.

After the clamps A and B are firmly held in the pipe $5_1$ by feeding pressurized fluid to them, the clamp C is likewise firmly held in the pipe $5'_1$ by feeding pressurized fluid to it, and subsequently, both the pipes $5_1$ and $5'_1$ are connected to each other by performing a welding operation around their tapered welding edges abutting against each other in the same manner as each of the first and second embodiments as mentioned above.

Figure 9:
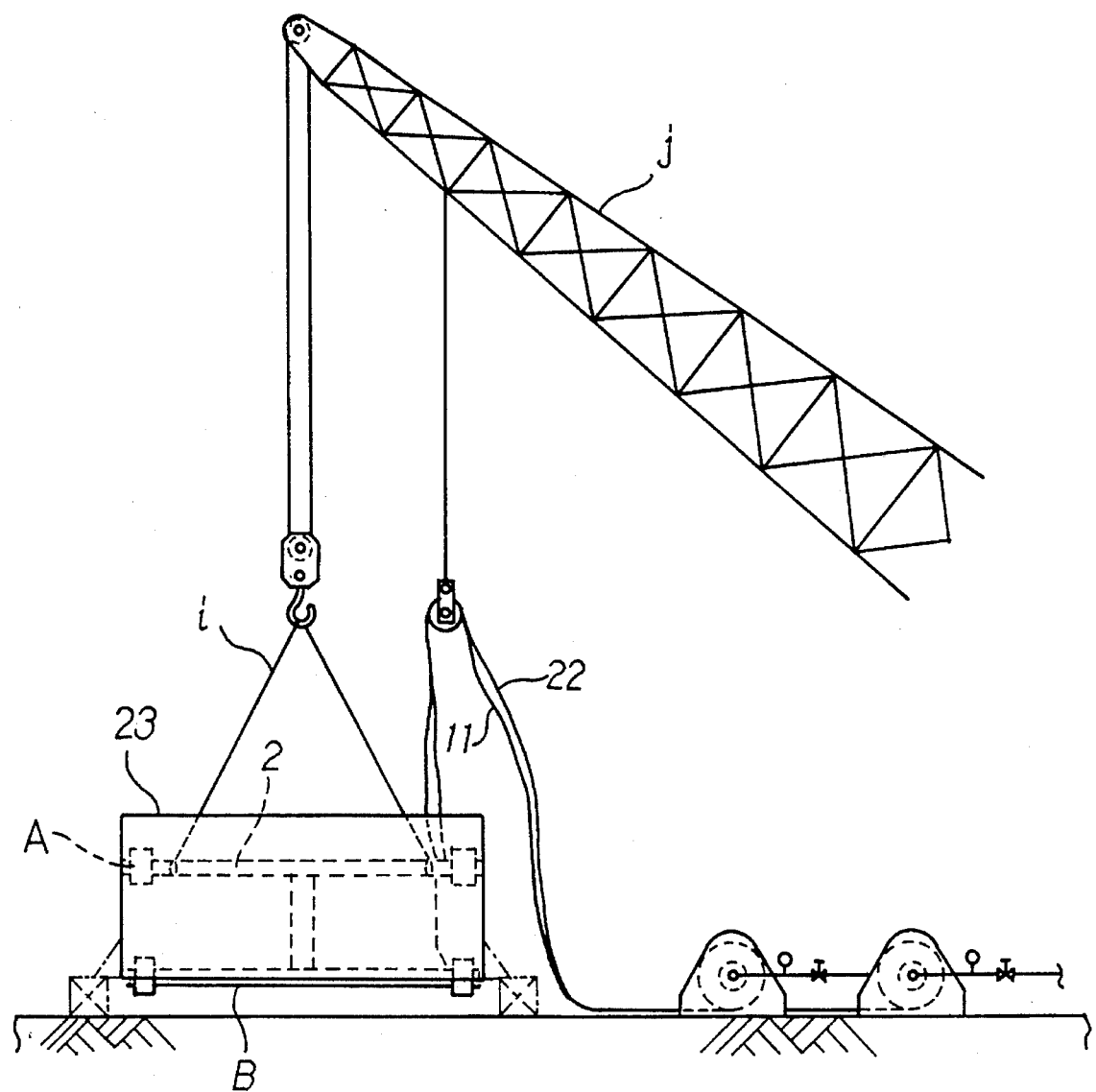
FIG. 9 is a side view which illustrates a method of connecting short cylindrical members to each other with a vertical attitude using a tandem type internal clamp in accordance with a fifth embodiment of the present invention.
Figure 10:
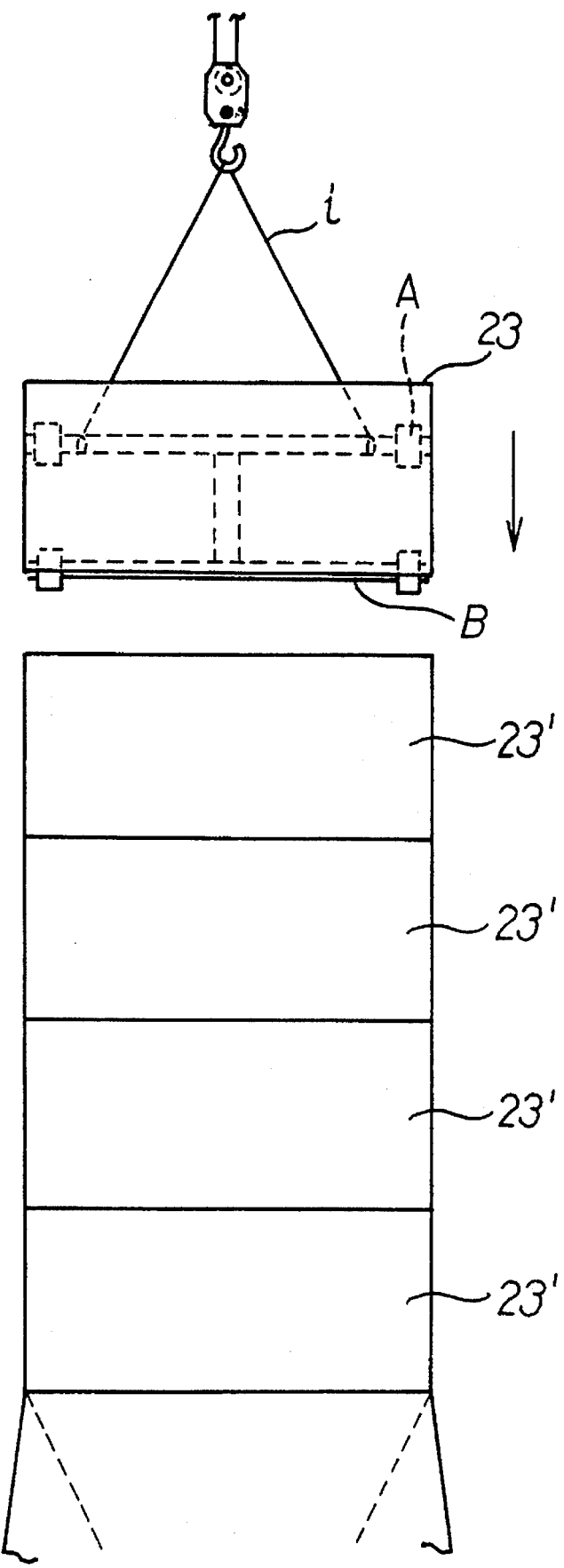
FIG. 10 is a side views which shows that several short cylindrical members are successively connected one above another with a vertical attitude by employing the method illustrated in FIG. 9.

Next, a method of connecting short cylindrical members, e.g., cylindrical casing segments to each other with a vertical attitude using a tandem type internal clamp in accordance with a fifth embodiment of the present invention will be described below with reference to FIG. 9 and FIG. 10.

This embodiment is concerned with a work for constructing a cylindrical tank, a tower-shaped bath, an underground shaft or a similar vertical elongated structure.

The tandem type internal clamp composed of two clamps A and B is inserted into a short cylindrical member 23 such as a cylindrical casing segment or the like having a large diameter and a small thickness. While a part of the clamp B is slightly projected outside of the lower end of the short cylindrical member 23, the clamp A is firmly held in the latter, and wire ropes i are wound about support rods 2 for the clamp A so that it is suspended from a hook of a crane j. While the foregoing state is maintained, the short cylindrical member 23 is raised up by operation the crane j and then displaced to a construction site as the crane j moves.

While the short cylindrical member 23 is suspended from the hook of the crane j via the wire ropes i, it is placed on an uppermost short cylindrical member 23', i.e., a part of the vertical elongated structure composed of a plurality of short cylindrical member 23' successively connected to each other in the vertical direction. At this time, a part of the clamp B is inserted into the uppermost short cylindrical member 23' at the upper end of the latter. Thereafter, both the short cylindrical short members 23 and 23' are connected to each other by performing a welding operation around their tapered welding edges abutting against each other.

Each of the aforementioned embodiments has been described above with respect to the case that the clamps A, B and C are designed to have a same structure. Since a clamp other than that located corresponding to a circular welding seam do not require the arrangement of components for feeding inert gas thereto, they can be designed and constructed in a simplified manner.

While the present invention has been described above with respect to five preferred embodiments thereof, it should of course be understood that the present invention should not be limited only to these embodiments but various change or modification may be made without any departure away from the scope of the present invention as defined by the appended claims.

What is claimed is:

1. A method of connecting cylindrical members such as pipes or the like to each other using a tandem type internal clamp composed of two or more clamps each including a main ring of which peripheral part exhibits a channel-shaped sectional contour and a plurality of expansion ring segments fitted into said main ring so as to be displaced in the radial direction, each of said expansion ring segments having two seal ring segments fixedly secured thereto on the opposite sides thereof, comprising the steps of;

locating said tandem type internal clamp in position in a first cylindrical member to be newly connected to a second cylindrical member already connected to a preceding cylindrical member in such a manner as to allow one of said clamps corresponding to a circular welding seam to be slightly projected outside of said first cylindrical member, radially displacing expansion ring segments of other clamp in the outward direction, causing seal ring segments of said other clamp to come in tight contact with the inner peripheral surface of said first cylindrical member, displacing said first cylindrical member until a tapered welding edge of the latter abuts against a tapered welding edge of said second cylindrical member, inserting the projected part of said one clamp into said second cylindrical member, radially displacing said expansion ring segments of said one clamp in the outward direction, causing one of seal ring segments of said one clamp to come in tight contact with the inner peripheral surface of said second cylindrical member, eliminating positional offset of said first cylindrical member relative to said second cylindrical member if any, by bringing said seal ring segments of said first and second cylindrical members in tight contact with the inner peripheral surfaces of the latter, feeding inert gas into the hollow space defined between said seal ring segments of each of said clamps, and performing a welding operation around the tapered welding edges of said first and second cylindrical members abutting against each other.

2. A method of connecting short cylindrical members such as cylindrical casing segments or the like to each other using a tandem type internal clamp composed of two or more clamps each including a main ring of which peripheral part exhibits a channel-shaped sectional contour and a plurality of expansion ring segments fitted into said main ring so as to be displaced in the radial direction, each of said expansion ring segments having two seal ring segments fixedly secured thereto on the opposite sides thereof, comprising the steps of;

locating said tandem type internal clamp in position in a first short cylindrical member to be newly connected to a second short cylindrical member already connected to a preceding short cylindrical member in such a manner as to allow one of said clamps corresponding to a circular welding seam to be slightly projected outside of said first short cylindrical member, radially displacing expansion ring segments of other clamp in the outward direction, causing seal ring segments of said other clamp to come in tight contact with the inner peripheral surface of said first short cylindrical member, displacing said first short cylindrical member until a tapered welding edge of the latter abuts against a tapered welding edge of said second short cylindrical member, inserting the projected part of said one clamp into said second short cylindrical member, radially displacing expansion ring segments of said one clamp in the outward direction, causing one of seal ring segments of said one clamp to come in tight contact with the inner peripheral surface of said second short cylindrical member, eliminating positional offset of said first short cylindrical member relative to said second short cylindrical member if any, by bringing said seal ring segments of said first and second short cylindrical members in tight contact with the inner peripheral surfaces of the latter, feeding inert gas into the hollow space defined between said seal ring segments of each of said clamps, and performing a welding operation around the tapered welding edges of said first and second short cylindrical members abutting against each other.

* * * * *